United States Patent
Balasubramanian et al.

(10) Patent No.: US 9,131,350 B2
(45) Date of Patent: Sep. 8, 2015

(54) EXTENDING EMBMS SESSION IN LTE EMBMS

(71) Applicant: QUALCOMM Incorporated, San Diego, CA (US)

(72) Inventors: Srinivasan Balasubramanian, San Diego, CA (US); Kuo-Chun Lee, San Diego, CA (US); Jack S. Shauh, San Diego, CA (US); Shailesh Maheshwari, San Diego, CA (US); John Jay Ketchum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 13/730,655

(22) Filed: Dec. 28, 2012

(65) Prior Publication Data
US 2014/0185455 A1    Jul. 3, 2014

(51) Int. Cl.
*H04W 4/06* (2009.01)
*H04W 48/20* (2009.01)
*H04W 68/00* (2009.01)

(52) U.S. Cl.
CPC ............... *H04W 4/06* (2013.01); *H04W 48/20* (2013.01); *H04W 68/005* (2013.01)

(58) Field of Classification Search
CPC .............. H04W 36/0005; H04W 36/0033; H04W 36/0055; H04W 36/0061; H04W 36/0083; H04W 36/08; H04W 36/12; H04W 48/18
USPC .......................... 370/312, 335, 355; 455/436
See application file for complete search history.

(56) References Cited

U.S. PATENT DOCUMENTS 7,565,138 B2 * 7/2009 Kim et al. .................. 455/414.3
2003/0231612 A1 * 12/2003 Kim et al. .................... 370/342
(Continued)

FOREIGN PATENT DOCUMENTS

EP         2293605 A1      3/2011

OTHER PUBLICATIONS

Huawei: "Summary of Email Discussion [74#34]—LTE—Rel-11 MBMS", 3GPP Draft, R2-114407 Summary of Email Discussion 74#34 LTE—REL 11 MBMS, 3rd Generation Partnership Project (3GPP), Mobile Competence Centre, 650, Route des Lucioles, F-06921 Sophia-Antipolis Cedex, France, vol. RAN WG2, No. Athens, Greece; 20110822, pp. 1-25, Aug. 16, 2011, XP050540088, [retrieved on Aug. 16, 2011].
(Continued)

*Primary Examiner* — Dang Ton
*Assistant Examiner* — Sai Aung
(74) *Attorney, Agent, or Firm* — Arent Fox LLP

(57) ABSTRACT

A method, an apparatus, and a computer program product for wireless communication are provided. The apparatus receives an MBMS service from a first cell in a first MBSFN area while in an RRC idle mode. The apparatus reselects to a second cell through an intra-frequency cell reselection upon moving into coverage of the second cell. The second cell is a non-MBSFN cell or an MBSFN cell in a second MBSFN area different than the first MBSFN area. The apparatus continues to receive the MBMS service directly from the first cell while receiving paging signals from the second cell.

46 Claims, 16 Drawing Sheets

(56) References Cited

U.S. PATENT DOCUMENTS

| | | | |
|---|---|---|---|
| 2007/0232308 A1* | 10/2007 | Bergstrom et al. | 455/436 |
| 2010/0311420 A1* | 12/2010 | Reza et al. | 455/436 |
| 2011/0159880 A1* | 6/2011 | Kumar et al. | 455/450 |
| 2011/0243056 A1* | 10/2011 | Jen | 370/312 |
| 2012/0122460 A1* | 5/2012 | Dalsgaard et al. | 455/444 |
| 2012/0182923 A1 | 7/2012 | Huang et al. | |
| 2012/0195221 A1 | 8/2012 | Wang et al. | |
| 2012/0220305 A1 | 8/2012 | Kuningas et al. | |
| 2012/0236776 A1 | 9/2012 | Zhang et al. | |
| 2012/0257562 A1 | 10/2012 | Kim et al. | |
| 2013/0301509 A1* | 11/2013 | Purnadi et al. | 370/312 |

OTHER PUBLICATIONS

International Search Report and Written Opinion—PCT/US2013/074733—ISA/EPO—Jun. 3, 2014.

Orange: "Text proposal for MBMS Service continuity when moving between SFN and non-SFN zones", 3GPP Draft, R3-070712 MBMS Service Continuity Text Proposal, 3rd Generation Partnership Project (3GPP), Mobile Competence Centre ; 650, Route des Lucioles, F-06921 Sophia-Antipolis Cedex, France, vol. RAN WG3, No. St. Julian, Malta, Apr. 2, 2007, pp. 1-14, XP050161609, (retrieved on Apr. 2, 2007].

* cited by examiner

EXTENDING EMBMS SESSION IN LTE EMBMS

BACKGROUND

1. Field

The present disclosure relates generally to communication systems, and more particularly, to extending an evolved Multimedia Broadcast Multicast Service (eMBMS) session in Long Term Evolution (LTE) eMBMS.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives a multimedia broadcast multicast service (MBMS) service from a first cell in a first multicast broadcast single frequency network (MBSFN) area while in a radio resource control (RRC) idle mode. The apparatus reselects to a second cell through an intra-frequency cell reselection upon moving into coverage of the second cell. The second cell is a non-MBSFN cell or an MBSFN cell in a second MBSFN area different than the first MBSFN area. The apparatus continues to receive the MBMS service directly from the first cell while receiving paging signals from the second cell.

DETAILED DESCRIPTION

Figure 1:
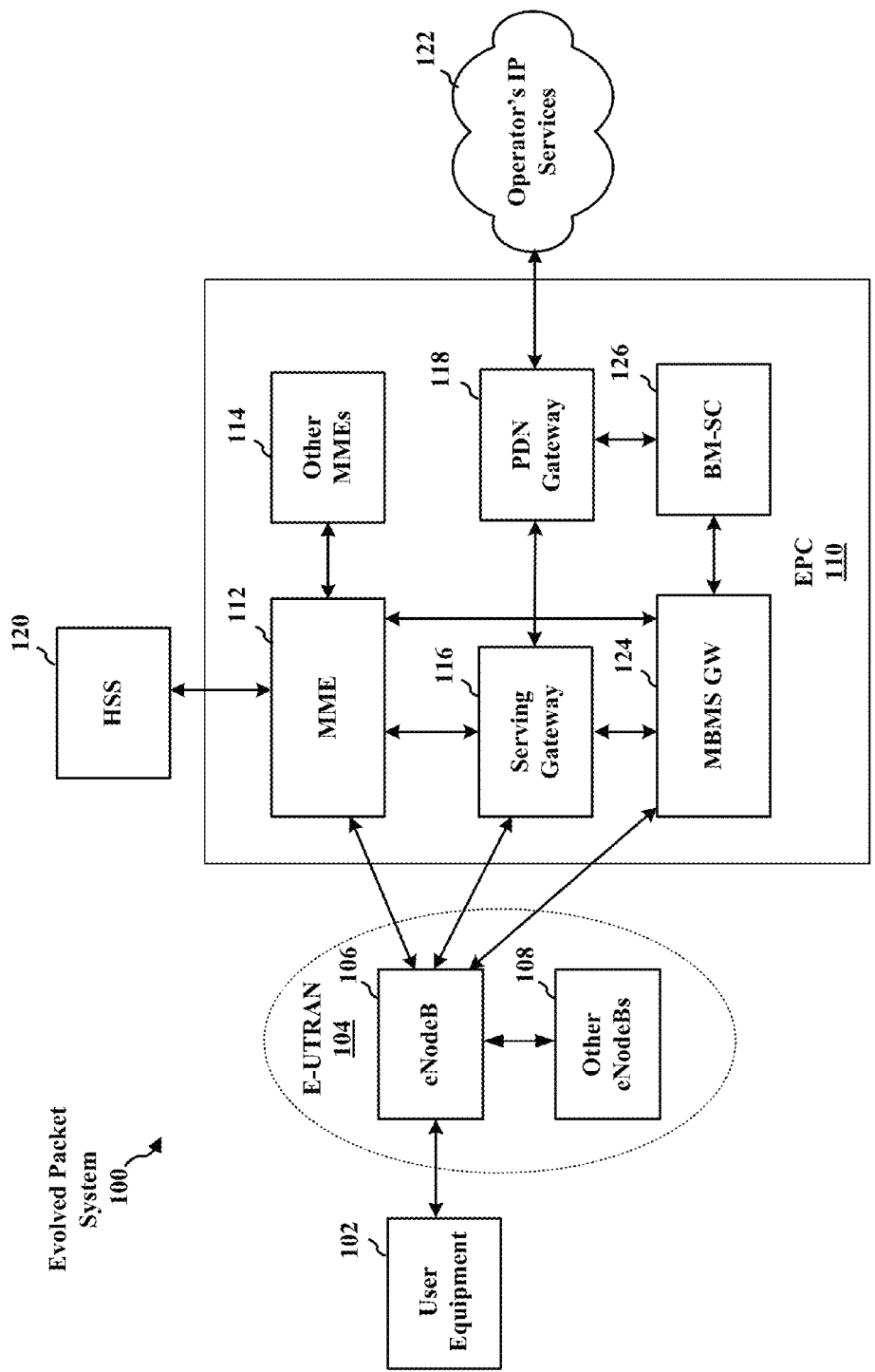
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to an MBSFN area broadcasting a particular service, and may be responsible for session management (start/stop) and for collecting eMBMS related charging information.

Figure 2:
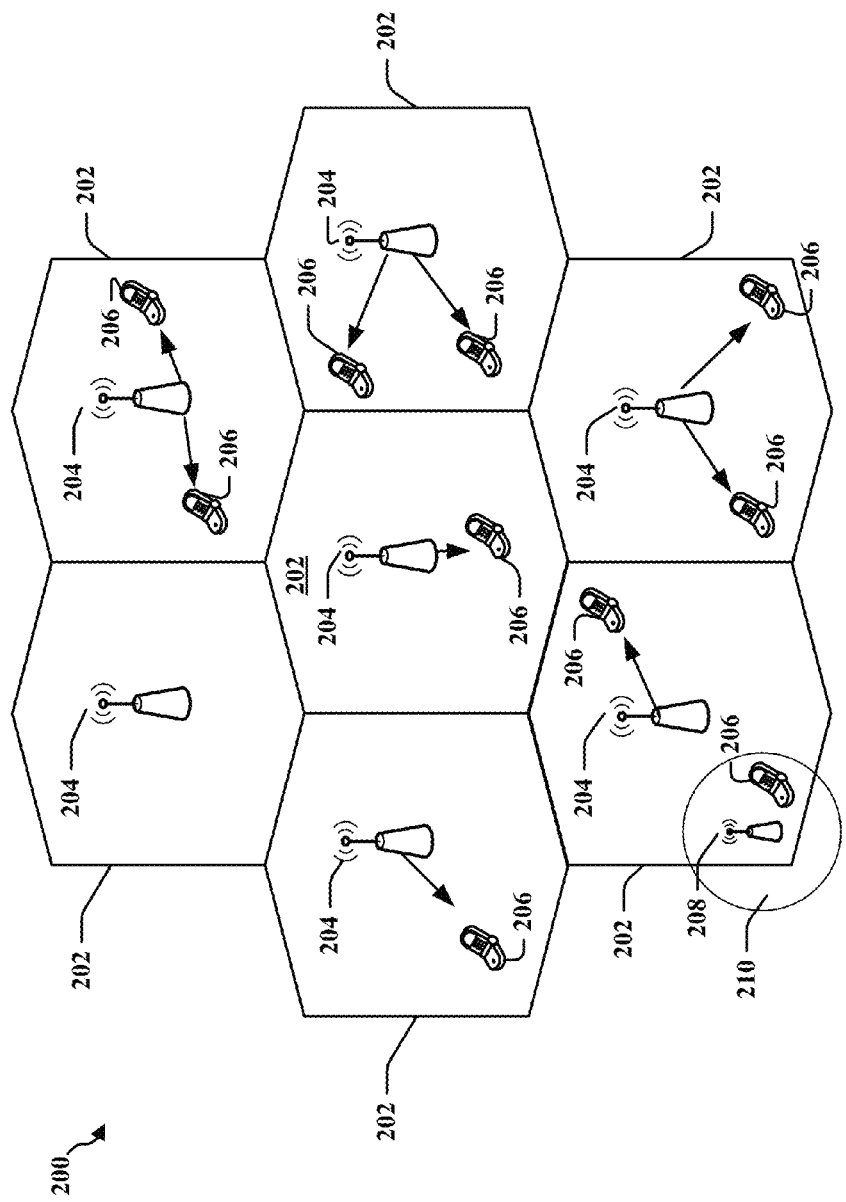
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
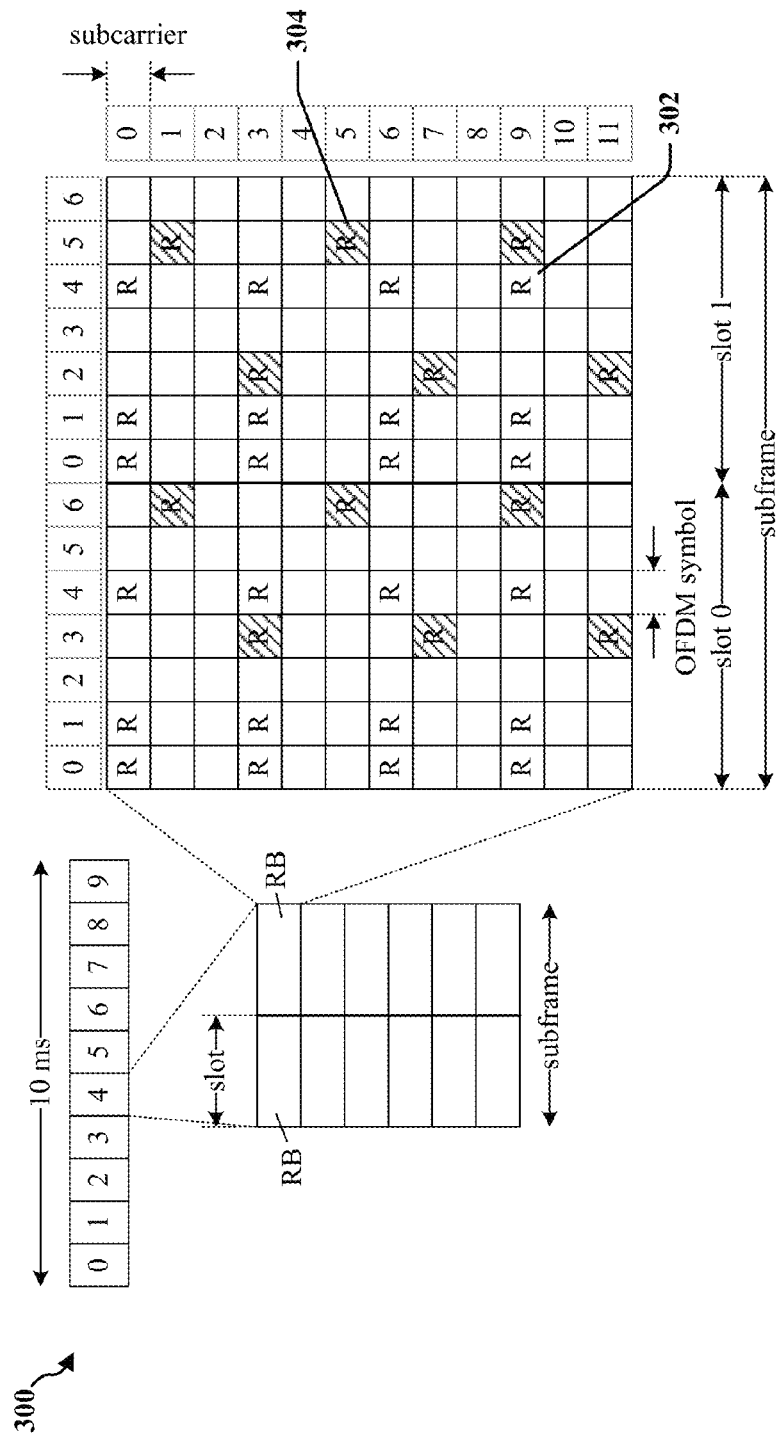
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
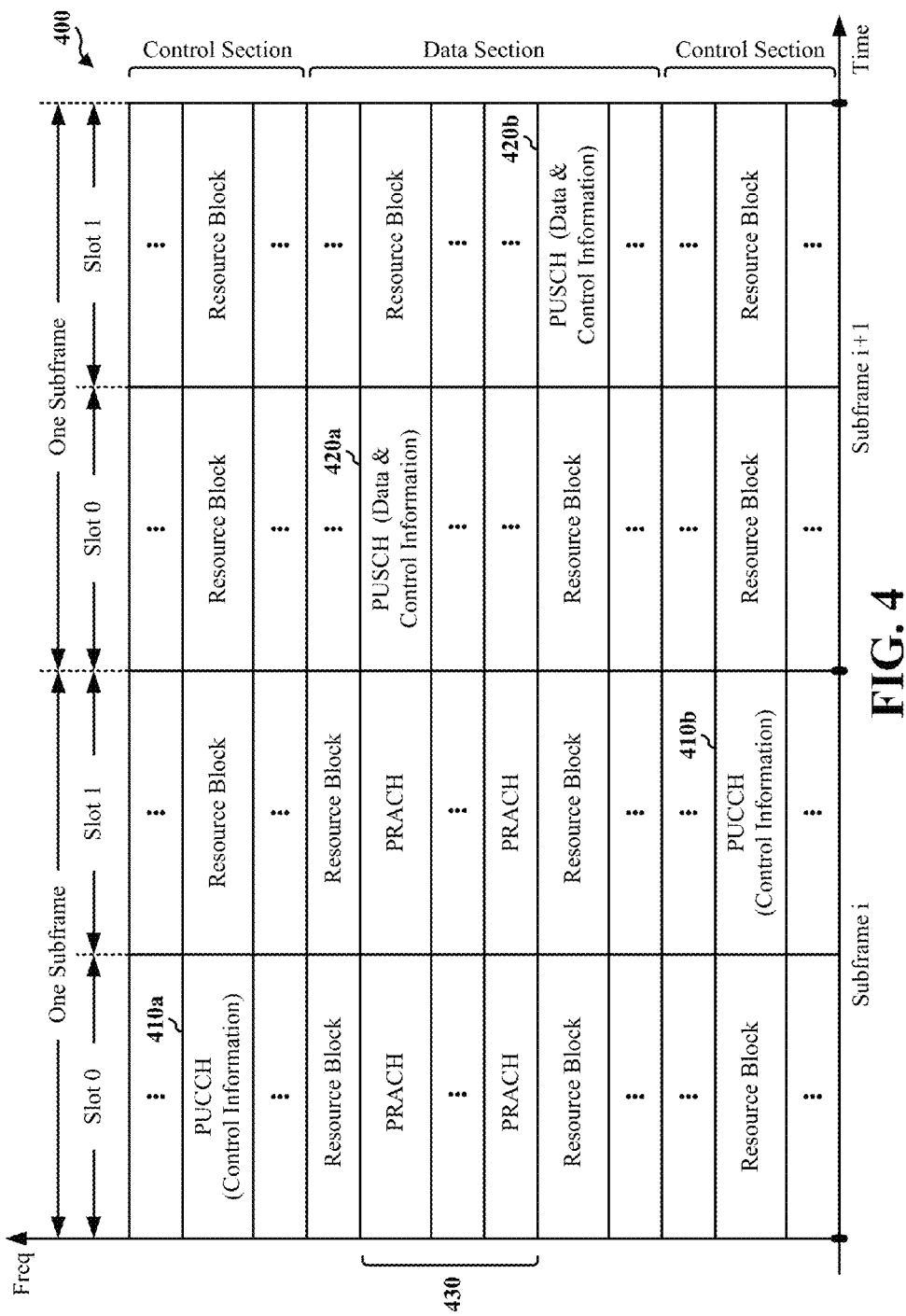
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
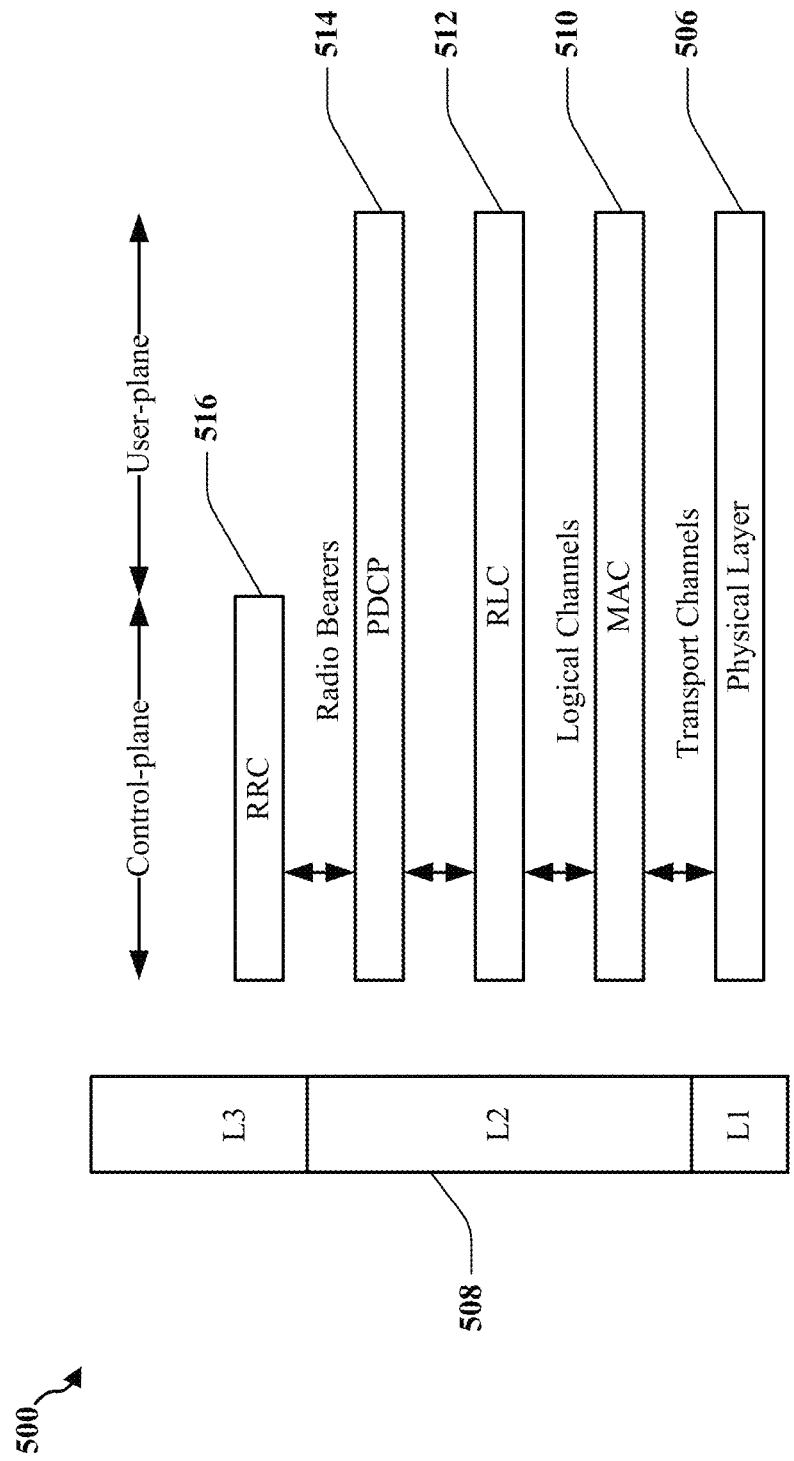
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
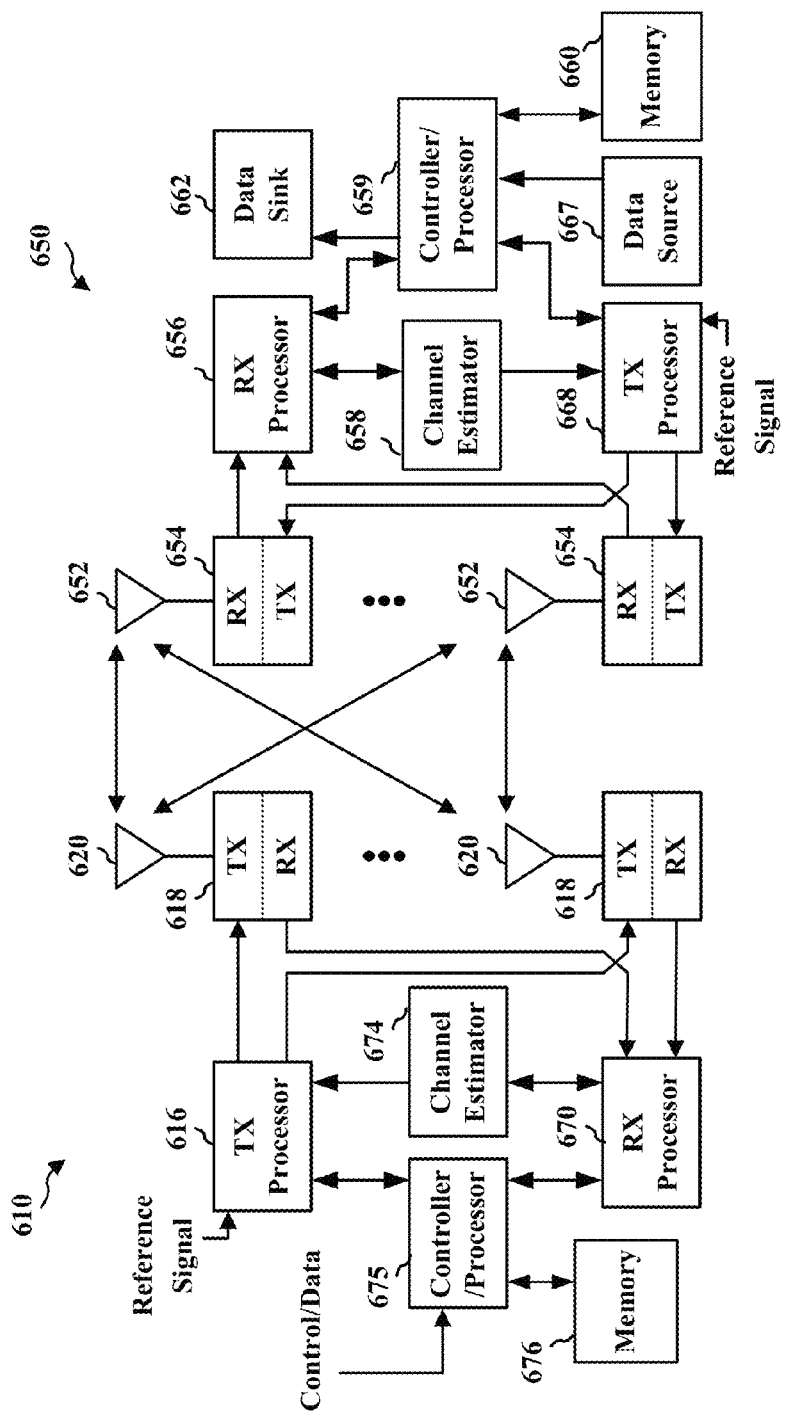
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
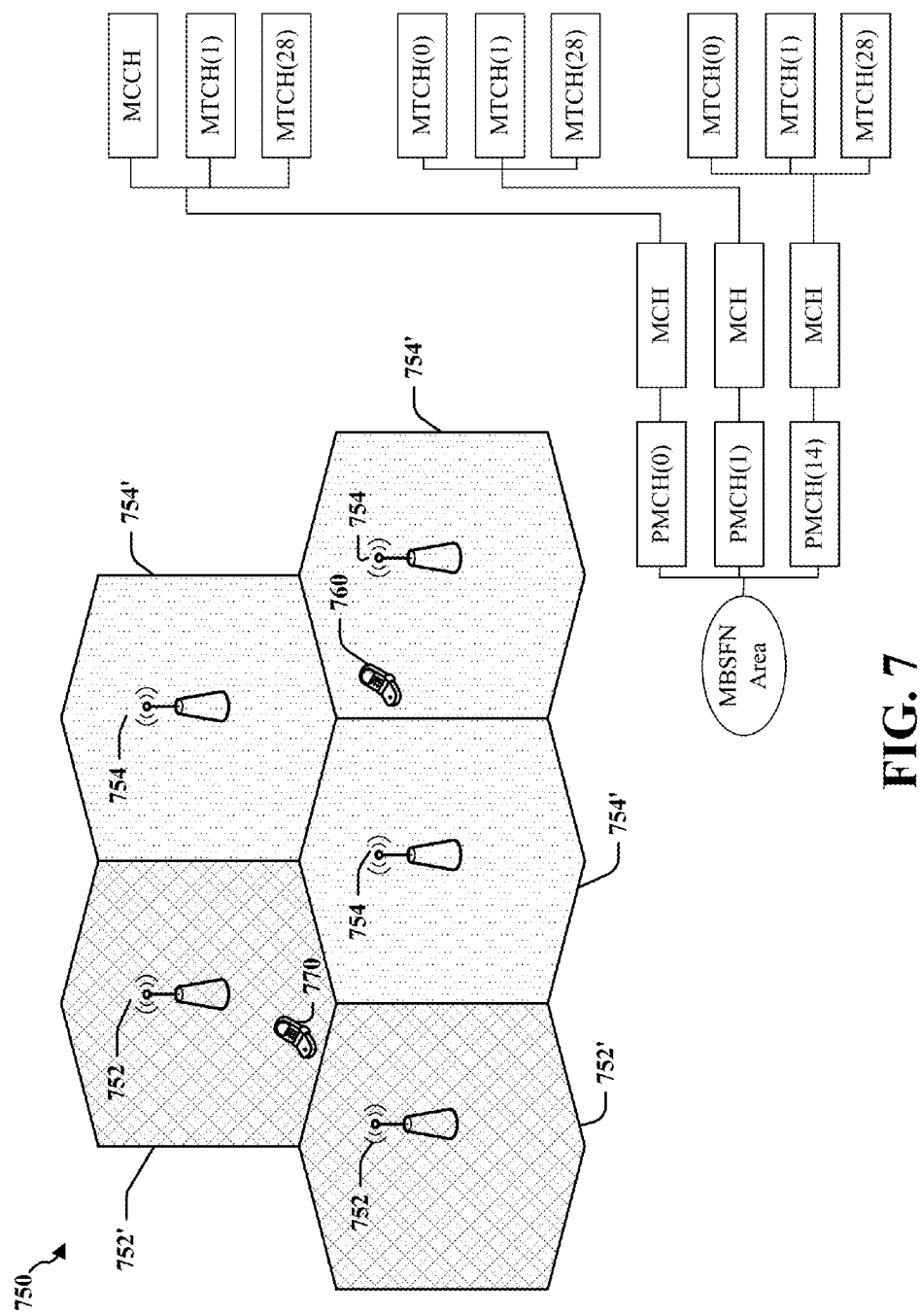
FIG. 7 is a diagram illustrating evolved Multimedia Broadcast Multicast Service in a Multicast Broadcast Single Frequency Network.

FIG. 7 is a diagram 750 illustrating evolved MBMS (eMBMS) in a Multicast Broadcast Single Frequency Network (MBSFN). The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

Figure 8A:
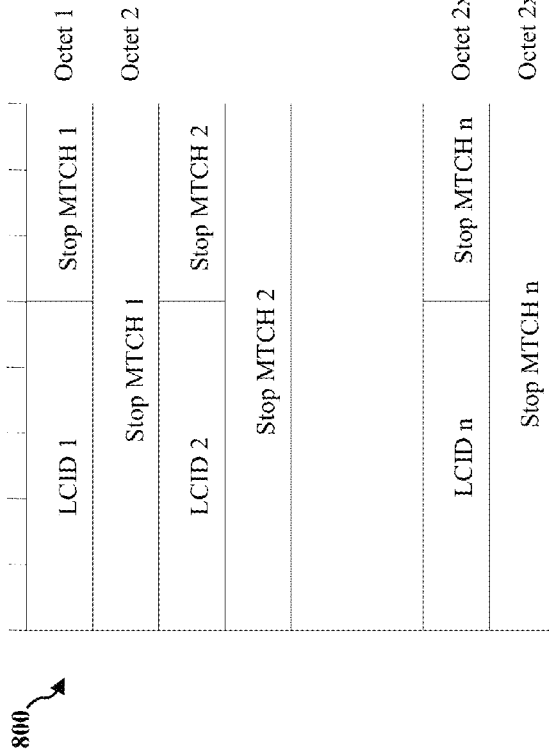
FIG. 8A is a diagram illustrating a format of a Multicast Channel Scheduling Information Media Access Control control element.

A UE can camp on an LTE cell to discover the availability of eMBMS service access and a corresponding access stratum configuration. In a first step, the UE acquires a system information block (SIB) 13 (SIB13). In a second step, based on the SIB13, the UE acquires an MBSFN Area Configuration message on an MCCH. The SIB13 indicates (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. The MBSFN Area Configuration message indicates (1) a temporary mobile group identity (TMGI) and an optional session identifier of each MTCH identified by a logical channel identifier within the PMCH, (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MCH Scheduling Information (MSI) MAC Control Element is transmitted. The MSI MAC Control Element may be sent once each MSP. The MSI MAC Control Element may be sent in the first subframe of each scheduling period of the PMCH. The MSI MAC Control Element can indicate the stop frame and subframe of each MTCH within the PMCH. FIG. 8A is a diagram 800 illustrating the format of an MSI MAC Control Element.

Figure 8B:
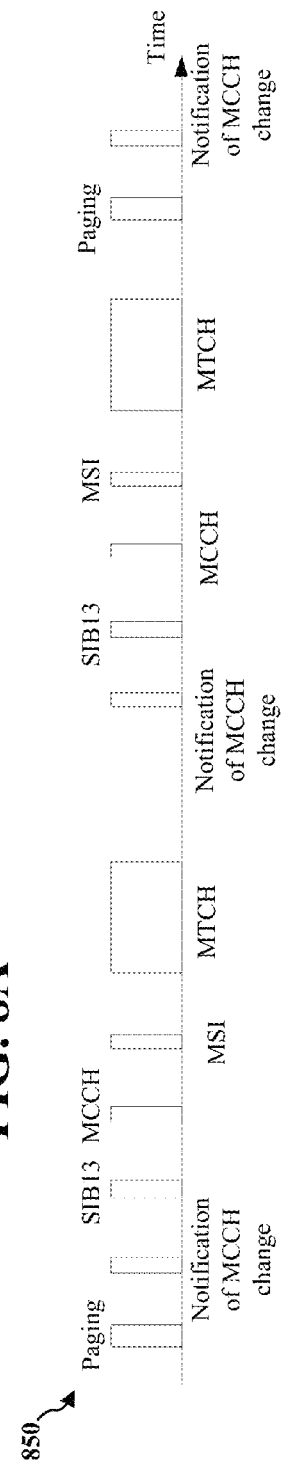
FIG. 8B is a diagram illustrating all required messages and data in eMBMS reception.

While receiving an eMBMS service, the UE may continue to receive the MTCH and to monitor (1) the MCCH of the MBSFN Area of an MTCH of interest, (2) an MSI MAC Control Element, (3) a notification of MCCH change if the UE is interested in receiving a new session (the notification is sent in a PDCCH 1C message scrambled based on an MBMS radio network temporary identifier (M-RNTI)), (4) paging for system information (SI) change, and (5) the SIB13. FIG. 8B is a diagram 850 illustrating various messages and data in eMBMS reception.

A UE in an RRC idle mode may follow a cell reselection procedure to change cells. The intra-frequency cell reselection may be based on measurements of the serving cell and the neighbor cell. CRS is measured to determine whether or not cell reselection should be triggered (e.g., when the serving cell signal is poor and neighbor cell signal is good). Intra-frequency cell reselection can cause the UE go to another cell that does not transmit the eMBMS session (e.g., as identified by a TMGI) of interest. However, the UE may still receive a good eMBMS signal after cell reselection because signals from multiple cells in the same MBSFN area can be combined at the UE to improve signal strength and quality. Methods and an apparatus are provided infra for allowing a UE to extend eMBMS session duration during and after intra-frequency cell reselection.

Figure 9:
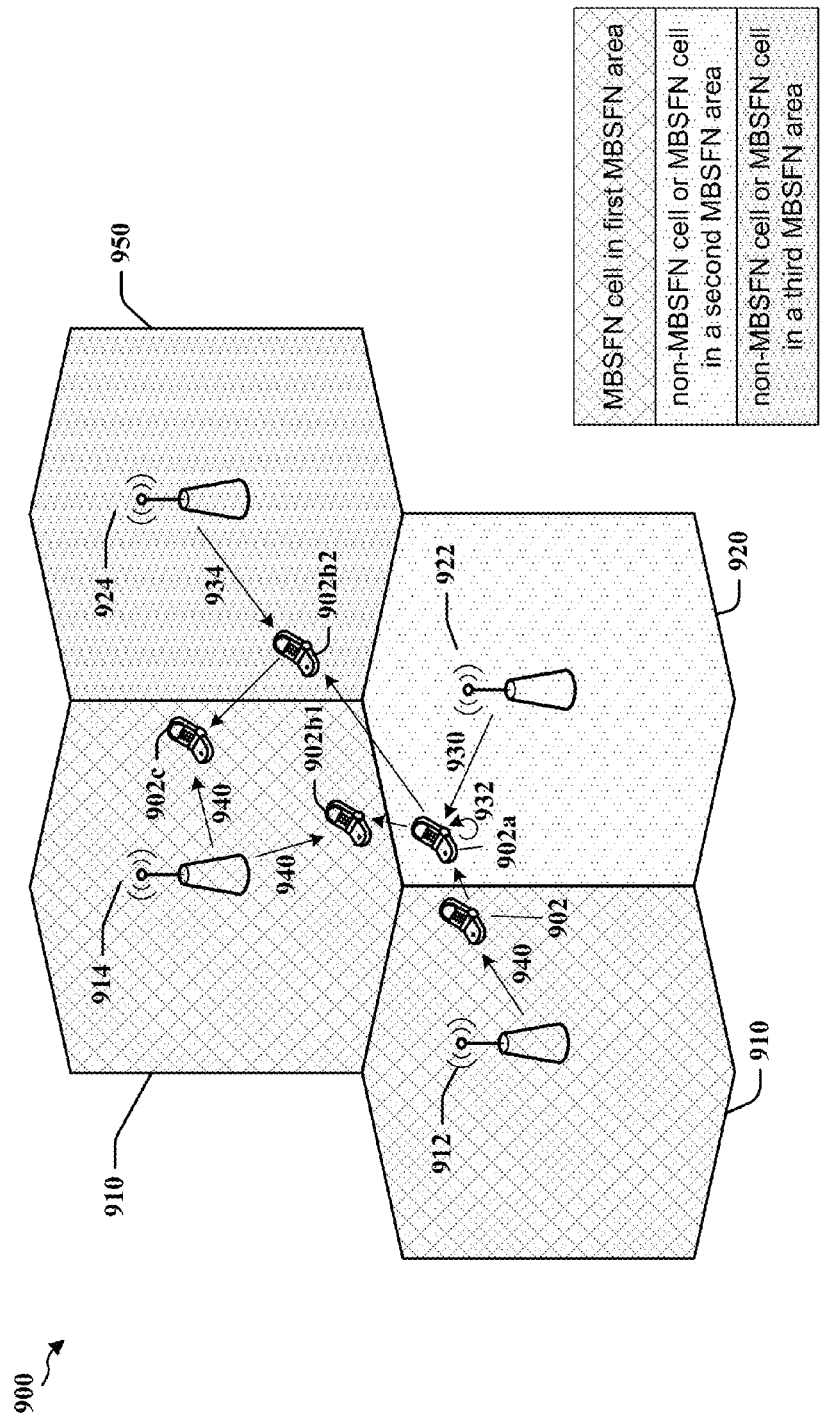
FIG. 9 is a diagram for illustrating an exemplary method.

FIG. 9 is a diagram 900 for illustrating an exemplary method. As shown in FIG. 9, the UE 902 is receiving an MBMS service 940 from a first cell 912 in a first MBSFN area 910 while in an RRC idle mode. The UE 902 (shown as 902a) reselects to a second cell 922 through an intra-frequency cell reselection upon moving into coverage of the second cell 922. The second cell 922 is a non-MBSFN cell or an MBSFN cell in a second MBSFN area 920 different than the first MBSFN area 910. The UE 902a continues to receive the MBMS service 940 from the first cell 912 while concurrently monitoring paging signals 930 from the second cell 922. The UE 902a receives the MBMS service 940 directly from the first cell 912, as the MBMS service 940 is received by the UE 902a directly from a transmission by the first cell 912. While monitoring paging signals 930 from the second cell 922, the UE 902a may also acquire SIBs 930 from the second cell 922. The UE 902a may determine whether a SIB13 was acquired from the second cell 922. If a SIB13 was not acquired from the second cell 922, then the second cell 922 is a non-MBSFN cell, and the UE 902a determines 932 to continue receiving the MBMS service 940 from the first cell. If a SIB13 was acquired from the second cell 922, then the second cell 922 is an MBSFN cell, and the UE 902a acquires an MCCH 930 from the second cell 922. Based on the acquired MCCH, the UE 902a then determines 932 whether the same MBMS service (identified by the same unique TMGI as the TMGI for the eMBMS service currently being received from the first cell 912) is provided by the second cell 922. If the same MBMS service is not provided by the second cell 922, the UE 902a determines to continue receiving the MBMS service 940 from the first cell 912. If the same MBMS service is provided by the second cell 922, the UE 902a switches from receiving the MBMS service 940 from the first cell 912 to receiving the MBMS service 930 from the second cell 922. Continuity of the MBMS service may be maintained in the switch from receiving the MBMS service from the first cell 912 to receiving the MBMS service from the second cell 922.

While the UE 902a is receiving the MBMS service 940 from the first cell 912 and concurrently monitoring paging signals 930 from the second cell 922, the UE 902a may monitor only MSI and/or an MCCH from the first cell 912 in order to reduce UE processing of messages from the first cell 912. As such, in order to reduce UE processing of messages from the first cell 912, the UE 902a may refrain from monitoring other messages such as the SIB13 and the notification of MCCH change from the first cell 912. When the UE refrains from monitoring the SIB13 and the notification of MCCH change from the first cell 912, the UE 902a may refrain from switching to receive a different (e.g., a new) MBMS service from the first cell 912 if information for the different MBMS service was not previously received from the first cell 912.

While the UE 902a is receiving the MBMS service 940 from the first cell 912 and concurrently monitoring paging signals 930 from the second cell 922, the UE 902a may determine whether data is being lost from the MBMS service 940 from the first cell 912 and/or a signal quality of the MBMS service 940 from the first cell 912. The UE 902a may then stop a reception of the MBMS service 940 when the lost data are greater than a first threshold and/or the signal quality is less than a second threshold, which may result in a high MBSFN subframe decoding error rate. MBSFN subframe decoding errors may be caused from the UE moving away from the MBSFN area associated with the first cell 912 so as not to receive the MBMS service 940 with sufficient signal quality and/or not to receive the MTCH correctly due to not monitoring the SIB13 and changes to the MCCH.

After moving to the edge of the first MBSFN area 910, the UE 902 may move back into coverage of cells in the first MBSFN area 910. As shown in FIG. 9, upon moving into coverage of a third cell 914 in the first MBSFN area 910, the UE 902 (shown as 902*b*1) may reselect to the third cell 914 from the second cell 922 through an intra-frequency cell reselection. The UE 902*b*1 continues to receive the MBMS service 940 from the third cell 914 while concurrently monitoring paging signals from the third cell 914. While the cells 912, 914 are shown as different cells, they may be the same cell. In such a case, upon moving into coverage of the first cell 912, the UE 902 reselects to the first cell 912 from the second cell 922 through an intra-frequency cell reselection and continues to receive the MBMS service 940 from the first cell 912 while concurrently monitoring paging signals from the first cell 912. As such, the UE may perform cell reselection back and forth at the MBSFN area border, either back to an old serving cell or another cell in the same MBSFN area as the old serving cell.

After moving to the edge of the first MSBFN area 910, the UE 902 may move along the edge of the first MBSFN area 910 into different cells. As shown in FIG. 9, the UE 902 (shown as 902*b*2) may reselect to a fourth cell 924 through an intra-frequency cell reselection upon moving into coverage of the fourth cell 924. The fourth cell 924 is a non-MBSFN cell or an MBSFN cell in a third MBSFN area 950 different than the first MBSFN area 910. The UE 902*b*2 may continue to receive the MBMS service 940 from one or more cells 912, 914 in the first MBSFN area 910 while concurrently monitoring paging signals 934 from the fourth cell 924. Thereafter, the UE 902 (shown as 902*c*) may reselect to the third cell 914 in the first MBSFN area 910 from the fourth cell 924 through an intra-frequency cell reselection upon moving into coverage of the third cell 914. The UE 902*c* continues to receive the MBMS service 940 from the third cell 914 while concurrently monitoring paging signals 940 from the third cell 914.

Figures 10A, 10B:
FIG. 10A and FIG. 10B are diagrams for illustrating an exemplary method.

FIG. 10A and FIG. 10B are diagrams for illustrating an exemplary method. The diagram 1000 shows a schedule to receive paging from the serving cell and the diagram 1050 shows the schedule to receive an MCCH, MSI, and an MTCH from a neighbor cell. The UE may refrain from receiving the SIB13 and notification of MCCH change in order to reduce the messages received and processed from the neighbor cell. As shown in the diagrams 1000, 1050, the paging and MBSFN reception are disjoint in time. In particular, in LTE FDD systems, paging can be received in subframes 0, 4, 5, and 9, and MBSFN messages and data can be received in subframes 1, 2, 3, 6, 7, and 8. In LTE TDD systems, paging can be received in subframes 0, 1, 5, and 6 (subframe 2 is always UL), and depending on the TDD UL/DL subframe configuration, MBSFN messages and data can be received in zero or more of the subframes 3, 4, 7, 8, and 9. When the serving cell and the neighbor cell are synchronous in radio frames (as required in MBSFN), the time interval to receive paging and the time interval to receive MCCH, MSI, and MTCH do not overlap. If the serving cell and neighbor cell are on the same frequency, a UE with a single receiver (or single receive chain) can receive the paging and MBSFN signals. The baseband processor can schedule processing of the paging subframe at one time and the MBSFN subframe(s) at another time.

When the UE is receiving an eMBMS service from the neighbor cell (old serving cell) and monitoring paging messages from the new serving cell, the UE may receive a page for setting up a mobile terminal call at the new serving cell. After the call is setup, the UE changes to an RRC connected mode in which the UE should receive every subframe from the new serving cell. While in the RRC connected mode and receiving a unicast service from the new serving cell, the UE may not receive eMBMS services from the neighbor cell because the services from the neighbor cell and the new serving cell will be concurrent so as to overlap in time. Accordingly, the UE has a conflict in being able to receive the MBMS service and the unicast service simultaneously because subframes carrying the MBMS service from the neighbor cell and subframes carrying the unicast service from the new serving cell will overlap.

In one configuration, the user is given a choice in relation to the unicast services from the new serving cell and the eMBMS services from the neighbor cell. In a first configuration, the UE receives a configuration (e.g., preconfigured based on user preference) for a priority setting indicating a priority between receiving the MBMS service from the neighbor cell and receiving a unicast service from the new serving cell. When the UE receives a message indicating a unicast service availability from the new serving cell, the UE determines whether to receive the unicast service or the MBMS service based on the configuration for the priority setting. In such a configuration, the UE stops the reception of the MBMS service and receives the unicast service when the configuration indicates a higher priority for the unicast service than the MBMS service, and continues to receive the MBMS service and refrains from receiving the unicast service when the configuration indicates a higher priority for the MBMS service than the unicast service. In a second configuration, the UE receives a message indicating a unicast service availability from the new serving cell, and then inquires from a user whether to receive the unicast service or to continue receiving the MBMS service. In such a configuration, the UE stops the reception of the MBMS service and receives the unicast service when the user indicates a desire to receive the unicast service, and continues to receive the MBMS service and refrains from receiving the unicast service when the user indicates a desire to continue receiving the MBMS service.

Figure 11:
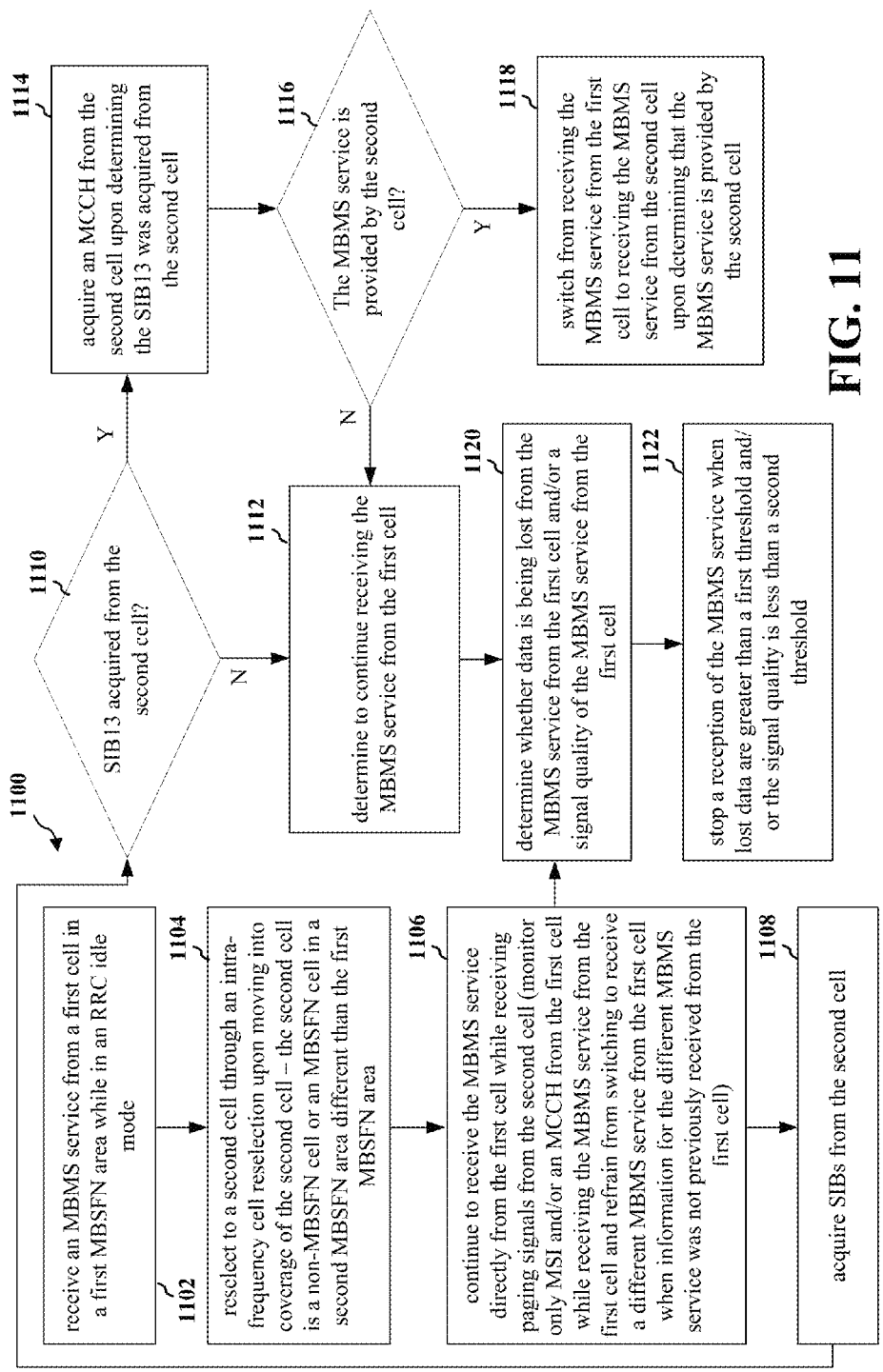
FIG. 11 is a flow chart of a first method of wireless communication.

FIG. 11 is a flow chart 1100 of a first method of wireless communication. The method may be performed by a UE. As shown in FIG. 11, in step 1102, a UE receives an MBMS service from a first cell in a first MBSFN area while in an RRC idle mode. In step 1104, the UE reselects to a second cell through an intra-frequency cell reselection upon moving into coverage of the second cell. The second cell is a non-MBSFN cell or an MBSFN cell in a second MBSFN area different than the first MBSFN area. In step 1106, the UE continues to receive the MBMS service directly from the first cell while receiving paging signals from the second cell. In step 1106, the UE may monitor only MSI and/or an MCCH from the first cell while receiving the MBMS service from the first cell. In addition, the UE may refrain from switching to receive a different MBMS service from the first cell when information for the different MBMS service was not previously received from the first cell.

For example, referring to FIG. 9, the UE 902 receives an MBMS service 940 from a first cell 912 in a first MBSFN area 910 while in an RRC idle mode. The UE 902 (shown as 902*a*) reselects to a second cell 922 through an intra-frequency cell reselection upon moving into coverage of the second cell 922. The second cell 922 is a non-MBSFN cell or an MBSFN cell in a second MBSFN area 920 different than the first MBSFN area 910. The UE 902a continues to receive the MBMS service 940 directly from the first cell 912 while receiving paging signals 930 from the second cell 922.

In step 1108, the UE may acquire SIBs from the second cell. In step 1110, the UE may determine whether a SIB13 was acquired from the second cell. If the SIB13 was not acquired from the second cell, in step 1112, the UE may determine to continue receiving the MBMS service from the first cell. If the SIB13 was acquired from the second cell, in step 1114, the UE may acquire an MCCH from the second cell. In step 1116, the UE may then determine whether the MBMS service is provided by the second cell based on the acquired MCCH. If the MBMS service is not provided by the second cell, in step 1112, the UE may determine to continue receiving the MBMS service from the first cell. However, if the UE determines that the MBMS service is provided by the second cell, in step 1118, the UE may switch from receiving the MBMS service from the first cell to receiving the MBMS service from the second cell. In step 1120, the UE may determine whether data is being lost from the MBMS service from the first cell and/or a signal quality of the MBMS service from the first cell. When lost data are greater than a first threshold and/or the signal quality is less than a second threshold, in step 1122, the UE may stop a reception of the MBMS service.

For example, referring to FIG. 9, the UE 902a may acquire SIBs from the second cell 922. The UE 902a may determine whether a SIB13 was acquired from the second cell 922. If the SIB13 was not acquired from the second cell 922, the UE 902a may determine to continue receiving the MBMS service 940 from the first cell 912. If the SIB13 was acquired from the second cell 922, the UE 902a may acquire an MCCH 930 from the second cell 922. The UE 902a may then determine whether the MBMS service (as currently being received from the first cell 912 with the same TMGI) is provided by the second cell 922 based on the acquired MCCH 930. If the MBMS service is not provided by the second cell 922, the UE 902a may determine to continue receiving the MBMS service 940 from the first cell 912. However, if the UE 902a determines that the MBMS service is provided by the second cell 922, the UE 902a may switch from receiving the MBMS service 940 from the first cell 912 to receiving the MBMS service 930 from the second cell 922. While the UE 902a is receiving the MBMS service 940 from the first cell 912, the UE 902a may determine whether data is being lost from the MBMS service 940 from the first cell 912 and/or a signal quality of the MBMS service 940 from the first cell 912. When lost data are greater than a first threshold and/or the signal quality is less than a second threshold, the UE 902a may stop a reception of the MBMS service 940. The first threshold and the second threshold may be set based on a tolerable MBSFN subframe decoding error rate.

Figure 12:
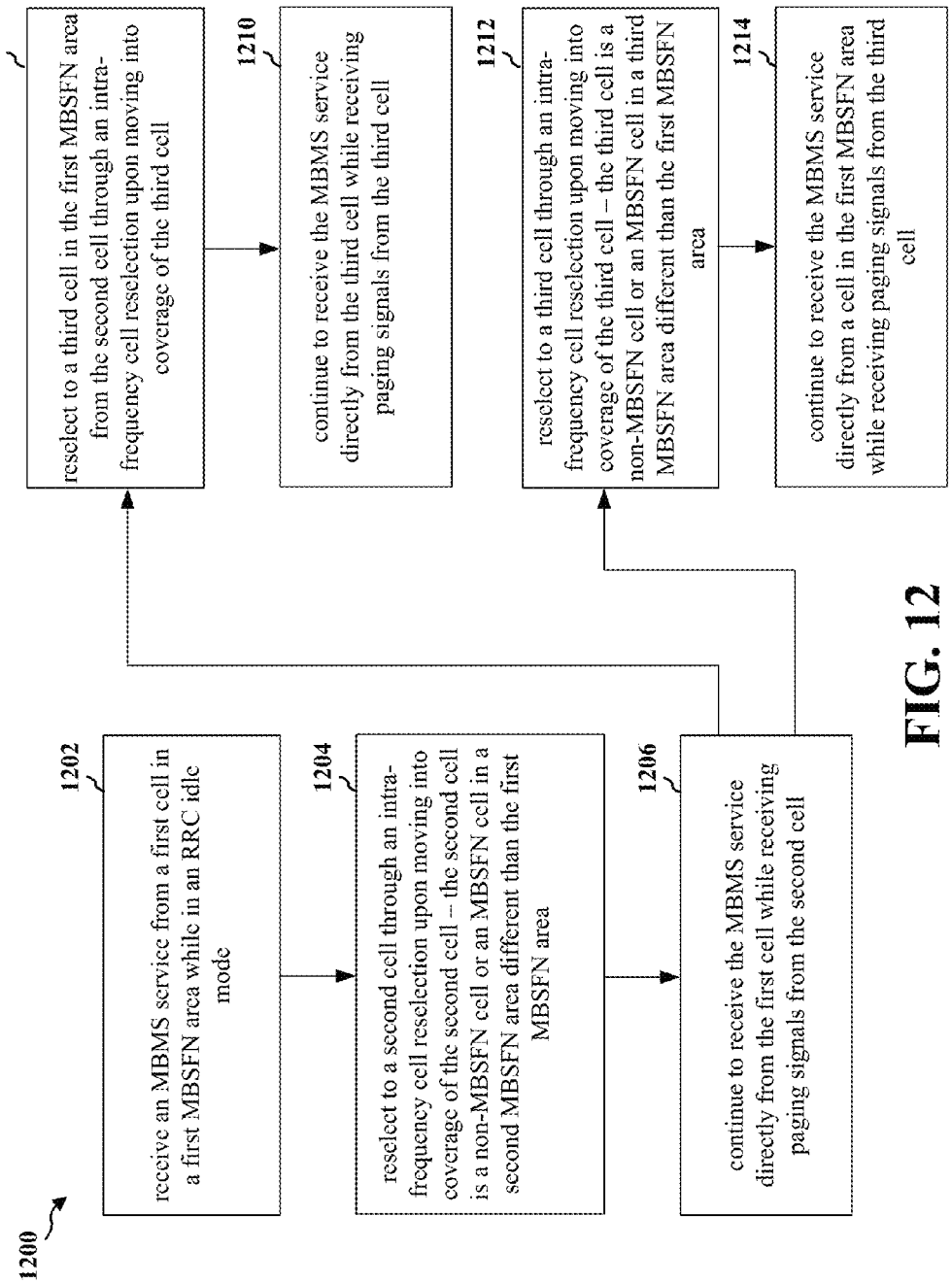
FIG. 12 is a flow chart of a second method of wireless communication.

FIG. 12 is a flow chart 1200 of a third method of wireless communication. The method may be performed by a UE. In step 1202, the UE receives an MBMS service from a first cell in a first MBSFN area while in an RRC idle mode. In step 1204, the UE reselects to a second cell through an intra-frequency cell reselection upon moving into coverage of the second cell. The second cell is a non-MBSFN cell or an MBSFN cell in a second MBSFN area different than the first MBSFN area. In step 1206, the UE continues to receive the MBMS service directly from the first cell while receiving paging signals from the second cell.

In step 1208, the UE may reselect to a third cell in the first MBSFN area from the second cell through an intra-frequency cell reselection upon moving into coverage of the third cell. In step 1210, the UE may continue to receive the MBMS service directly from the third cell while receiving paging signals from the third cell. For example, referring to FIG. 9, the UE 902a (shown as 902b1) may reselect to a third cell 914 in the first MBSFN area 910 from the second cell 922 through an intra-frequency cell reselection upon moving into coverage of the third cell 914. The UE 902b1 may continue to receive the MBMS service 940 directly from the third cell 914 while receiving paging signals from the third cell 914. The third cell may be the original serving cell 912. In such case, the UE 902a may reselect to the third cell 914 in the first MBSFN area 910 from the second cell 922 through an intra-frequency cell reselection upon moving into coverage of the third cell 914. The UE may continue to receive the MBMS service 940 directly from the third cell 914 while receiving paging signals from the third cell 914. Accordingly, the UE may perform cell reselection back and forth with neighboring cells along the cell border, maintaining MBMS service reception from the first MBSFN area 910.

In step 1212, the UE may reselect to a third cell through an intra-frequency cell reselection upon moving into coverage of the third cell. The third cell is a non-MBSFN cell or an MBSFN cell in a third MBSFN area different than the first MBSFN area. In step 1214, the UE may continue to receive the MBMS service directly from one or more cells in the first MBSFN area while receiving paging signals from the third cell. For example, referring to FIG. 9, the UE 902a (shown as 902b2) may reselect to a third cell 924 through an intra-frequency cell reselection upon moving into coverage of the third cell 924. The third cell 924 is a non-MBSFN cell or an MBSFN cell in a third MBSFN area 950 different than the first MBSFN area 910. The UE 902b may continue to receive the MBMS service 940, 940 directly from one or more cells 912, 914 in the first MBSFN area 910 while receiving paging signals 934 from the third cell 924.

Figure 13:
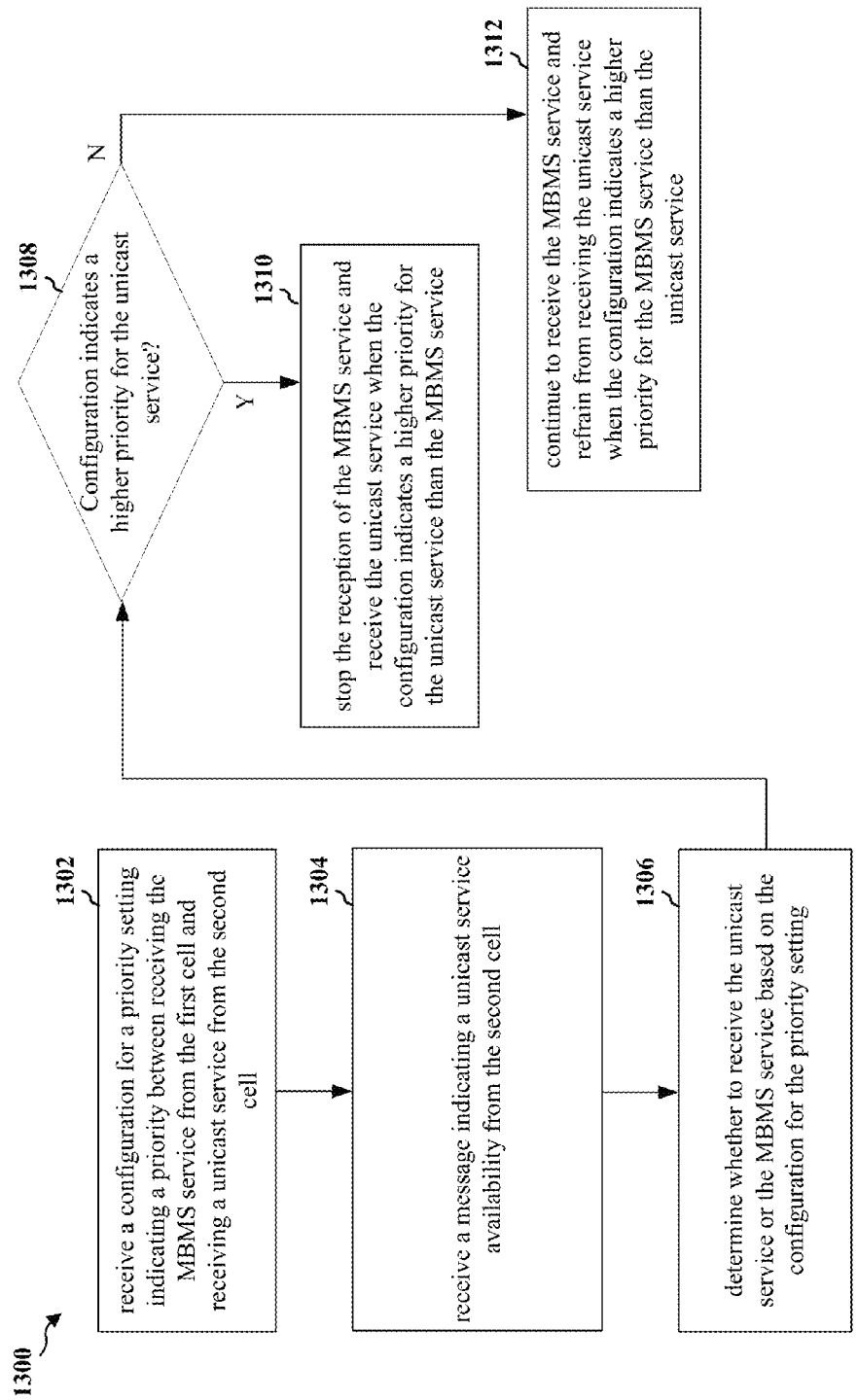
FIG. 13 is a flow chart of a third method of wireless communication.

FIG. 13 is a flow chart 1300 of a fourth method of wireless communication. The method may be performed by a UE. In step 1302, the UE may receive a configuration for a priority setting indicating a priority between receiving the MBMS service from the first cell and receiving a unicast service from the second cell. The UE may receive the configuration for a priority setting through user input or through a pre-configured priority setting. In step 1304, the UE may receive a message indicating a unicast service availability from the second cell. In step 1306, the UE may determine whether to receive the unicast service or the MBMS service based on the configuration for the priority setting. In step 1308, when the configuration indicates a higher priority for the unicast service than the MBMS service, in step 1310, the UE may stop the reception of the MBMS service and receiving the unicast service. In step 1308, when the configuration indicates a higher priority for the MBMS service than the unicast service, in step 1312, the UE may continue to receive the MBMS service and refrain from receiving the unicast service.

Figure 14:
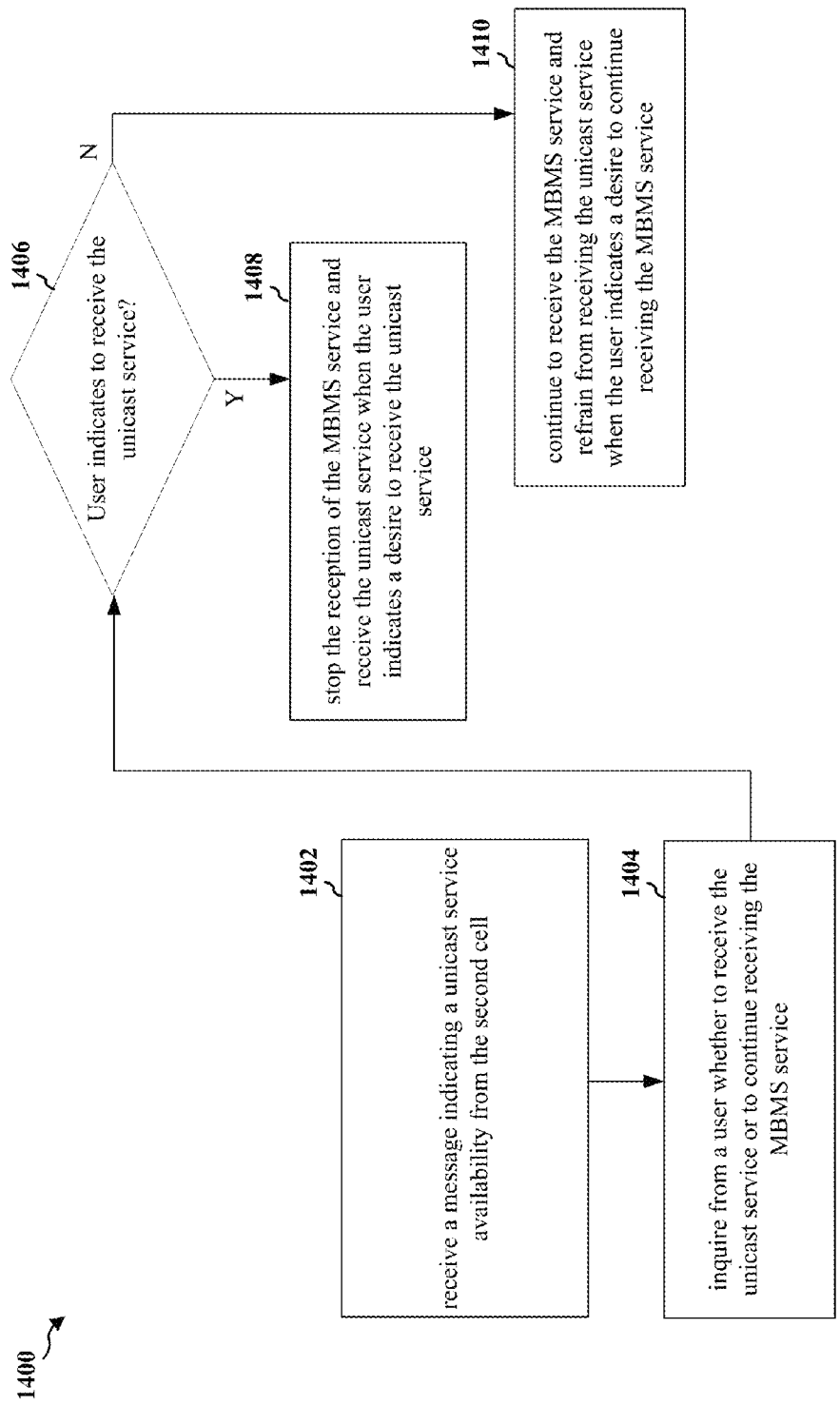
FIG. 14 is a flow chart of a fourth method of wireless communication.

FIG. 14 is a flow chart 1400 of a second method of wireless communication. The method may be performed by a UE. In step 1402, the UE receives a message indicating a unicast service availability from the second cell. In step 1404, the UE inquires from a user whether to receive the unicast service or to continue receiving the MBMS service. For example, the UE may present a selection window for selecting whether to receive the unicast service or to continue receiving the MBMS service. In step 1406, when the user indicates a desire to receive the unicast service (e.g., through a selection in the selection window), in step 1408, the UE may stop the reception of the MBMS service and receive the unicast service. In step 1406, when the user indicates a desire to continue receiving the MBMS service (e.g., through a selection in the selection window), in step 1410, the UE may continue to receive the MBMS service and refrain from receiving the unicast service.

Figure 15:
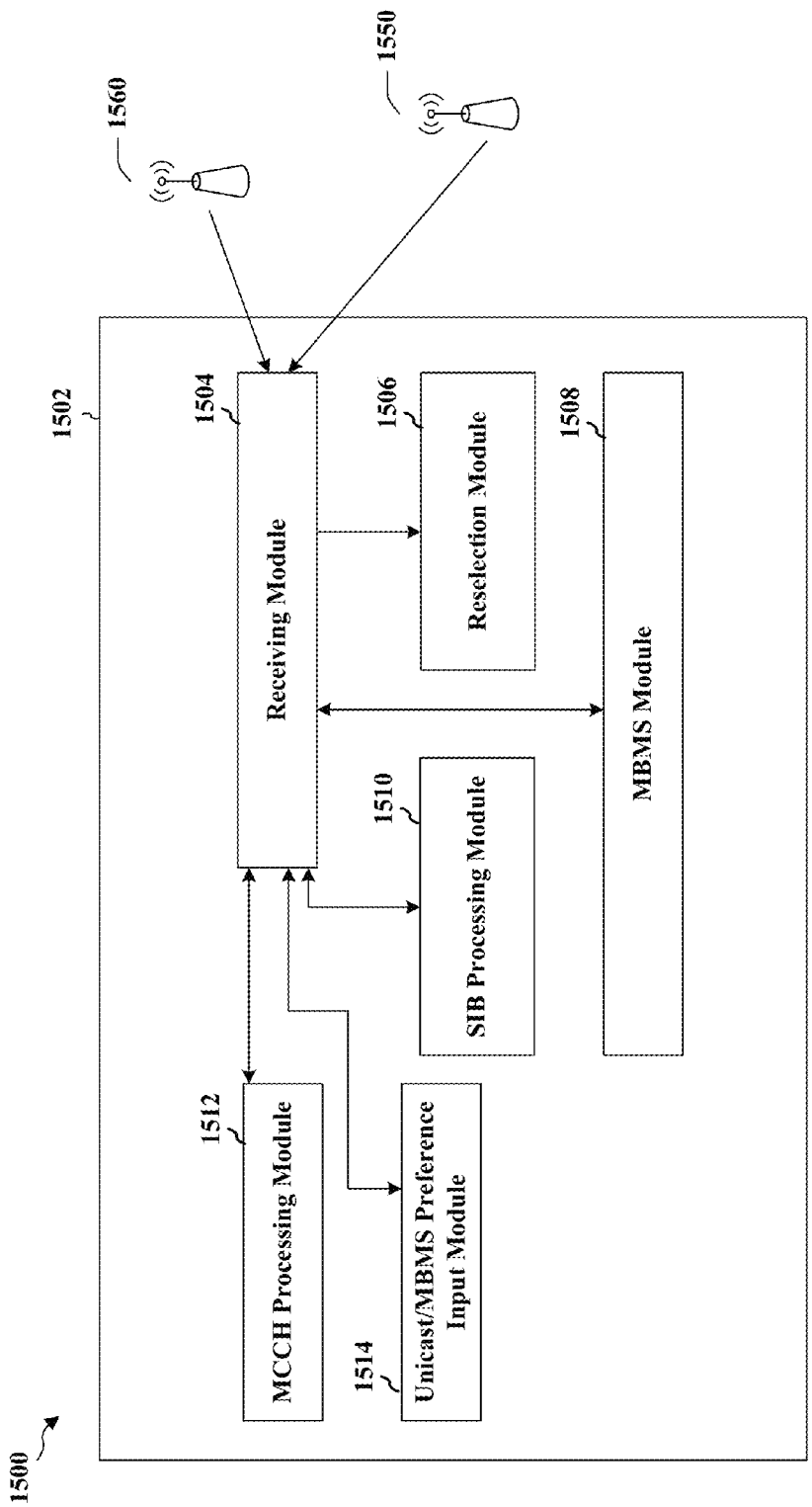
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus 1502 includes a receiving module 1504 that is configured to receive an MBMS service from a first cell 1550 in a first MBSFN area while in an RRC idle mode. The apparatus 1502 further includes a reselection module 1506 that is configured to reselect to a second cell 1560 through an intra-frequency cell reselection upon moving into coverage of the second cell 1560. The second cell 1560 is a non-MBSFN cell or an MBSFN cell in a second MBSFN area different than the first MBSFN area. Receiving module 1504 is further configured to continue to receive the MBMS service directly from the first cell 1550 while receiving paging signals from the second cell 1560. The receiving module 1504 may be further configured to acquire SIBs from the second cell 1560. The receiving module 1504 is configured to provide the received SIBs to a SIB processing module 1510, which is configured to determine whether a SIB13 was acquired from the second cell 1560. The receiving module 1504 may be further configured to determine to continue receiving the MBMS service from the first cell 1550 upon determining that the SIB13 was not acquired from the second cell 1560. The receiving module 1504 may be configured to acquire an MCCH from the second cell 1560 upon determining the SIB13 was acquired from the second cell 1560. The receiving module 1504 may be configured to provide the acquired MCCH to an MCCH processing module 1512, which may be configured to determine whether the MBMS service is provided by the second cell 1560 based on the acquired MCCH. The receiving module 1504 may be configured to determine to continue receiving the MBMS service from the first cell 1550 upon determining that the MBMS service is not provided by the second cell 1560. The receiving module 1504 may be configured to switch from receiving the MBMS service from the first cell 1550 to receiving the MBMS service from the second cell 1560 upon determining that the MBMS service is provided by the second cell 1560. The receiving module 1504 may be configured to monitor only MSI and/or an MCCH from the first cell 1550 while receiving the MBMS service from the first cell 1550. The receiving module 1504 may be configured to refrain from switching to receive a different MBMS service from the first cell 1550 when information for the different MBMS service was not previously received from the first cell 1550. The receiving module 1504 may be configured to provide the received MBMS service to an MBMS module 1508. The MBMS module 1508 may be configured to determine whether data is being lost from the MBMS service from the first cell 1550 and/or a signal quality of the MBMS service from the first cell 1550. The receiving module 1504 may be configured to stop a reception of the MBMS service when lost data are greater than a first threshold and/or the signal quality is less than a second threshold.

The receiving module 1504 may be configured to reselect to a third cell in the first MBSFN area from the second cell 1560 through an intra-frequency cell reselection upon moving into coverage of the third cell, and to continue to receive the MBMS service directly from the third cell while receiving paging signals from the third cell. The receiving module 1504 may be configured to reselect to a third cell through an intra-frequency cell reselection upon moving into coverage of the third cell. The third cell is a non-MBSFN cell or an MBSFN cell in a third MBSFN area different than the first MBSFN area. The receiving module 1504 may be further configured to continue to receive the MBMS service directly from one or more cells in the first MBSFN area while receiving paging signals from the third cell.

The apparatus 1502 may further include a unicast/MBMS preference input module 1514. The unicast/MBMS preference input module 1514 may be configured to receive a configuration for a priority setting indicating a priority between receiving the MBMS service from the first cell 1550 and receiving a unicast service from the second cell 1560, to receive a message indicating a unicast service availability from the second cell 1560, and to determine whether to receive the unicast service or the MBMS service based on the configuration for the priority setting. The receiving module 1504 may be configured to stop the reception of the MBMS service and receive the unicast service when the configuration indicates a higher priority for the unicast service than the MBMS service, and to continue to receive the MBMS service and to refrain from receiving the unicast service when the configuration indicates a higher priority for the MBMS service than the unicast service. The unicast/MBMS preference input module 1514 may be configured to receive a message indicating a unicast service availability from the second cell 1560, and to inquire from a user whether to receive the unicast service or to continue receiving the MBMS service. The receiving module 1504 may be configured to stop the reception of the MBMS service and to receive the unicast service when the user indicates a desire to receive the unicast service, and to continue to receive the MBMS service and to refrain from receiving the unicast service when the user indicates a desire to continue receiving the MBMS service.

The apparatus may include additional modules that perform each of the steps of the algorithm in the aforementioned flow charts of FIGS. 11-14. As such, each step in the aforementioned flow charts of FIGS. 11-14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
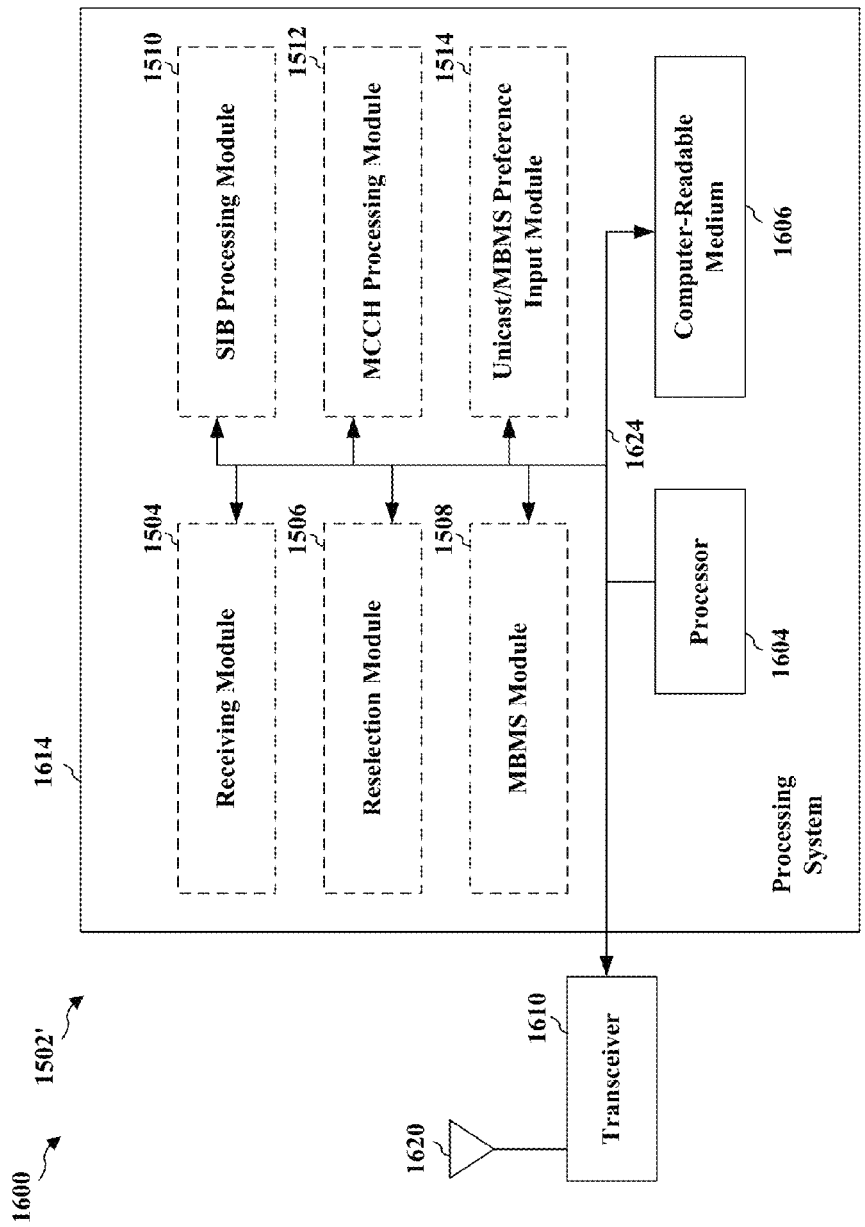
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1508, 1510, 1512, 1514, and the computer-readable medium 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the receiving module 1504. In addition, the transceiver 1610 receives information from the processing system 1614, and based on the received information, generates a signal to be applied to the one or more antennas 1620. The processing system 1614 includes a processor 1604 coupled to a computer-readable medium 1606. The processor 1604 is responsible for general processing, including the execution of software stored on the computer-readable medium 1606. The software, when executed by the processor 1604, causes the processing system 1614 to perform the various functions described supra for any particular apparatus. The computer-readable medium 1606 may also be used for storing data that is manipulated by the processor 1604 when executing software. The processing system further includes at least one of the modules 1504, 1506, 1508, 1510, 1512, and 1514. The modules may be software modules running in the processor 1604, resident/stored in the computer readable medium 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1502/1502' for wireless communication includes means for receiving an MBMS service from a first cell in a first MBSFN area while in an RRC idle mode. The apparatus further includes means for reselecting to a second cell through an intra-frequency cell reselection upon moving into coverage of the second cell. The second cell is a non-MBSFN cell or an MBSFN cell in a second MBSFN area different than the first MBSFN area. The apparatus further includes means for continuing to receive the MBMS service directly from the first cell while receiving paging signals from the second cell. The apparatus may further include means for acquiring SIBs from the second cell, and means for determining whether a SIB13 was acquired from the second cell. The apparatus may further include means for determining to continue receiving the MBMS service from the first cell upon determining that the SIB13 was not acquired from the second cell. The apparatus may further include means for acquiring an MCCH from the second cell upon determining the SIB13 was acquired from the second cell, and means for determining whether the MBMS service is provided by the second cell based on the acquired MCCH. The apparatus may further include means for determining to continue receiving the MBMS service from the first cell upon determining that the MBMS service is not provided by the second cell. The apparatus may further include means for switching from receiving the MBMS service from the first cell to receiving the MBMS service from the second cell upon determining that the MBMS service is provided by the second cell. The apparatus may further include means for monitoring only at least one of MSI or an MCCH from the first cell while receiving the MBMS service from the first cell. The apparatus may further include means for refraining from switching to receive a different MBMS service from the first cell when information for the different MBMS service was not previously received from the first cell. The apparatus may further include means for determining at least one of whether data is being lost from the MBMS service from the first cell or a signal quality of the MBMS service from the first cell, and means for stopping a reception of the MBMS service when at least one of lost data are greater than a first threshold or the signal quality is less than a second threshold. The apparatus may further include means for reselecting to a third cell in the first MBSFN area from the second cell through an intra-frequency cell reselection upon moving into coverage of the third cell, and means for continuing to receive the MBMS service directly from the third cell while receiving paging signals from the third cell. The apparatus may further include means for receiving a configuration for a priority setting indicating a priority between receiving the MBMS service from the first cell and receiving a unicast service from the second cell, means for receiving a message indicating a unicast service availability from the second cell, and means for determining whether to receive the unicast service or the MBMS service based on the configuration for the priority setting. The apparatus may further include means for stopping the reception of the MBMS service and receiving the unicast service when the configuration indicates a higher priority for the unicast service than the MBMS service, and means for continuing to receive the MBMS service and refraining from receiving the unicast service when the configuration indicates a higher priority for the MBMS service than the unicast service. The apparatus may further include means for receiving a message indicating a unicast service availability from the second cell, and means for inquiring from a user whether to receive the unicast service or to continue receiving the MBMS service. The apparatus may further include means for stopping the reception of the MBMS service and receiving the unicast service when the user indicates a desire to receive the unicast service, and means for continuing to receive the MBMS service and refraining from receiving the unicast service when the user indicates a desire to continue receiving the MBMS service. The apparatus may further include means for reselecting to a third cell through an intra-frequency cell reselection upon moving into coverage of the third cell, the third cell being a non-MBSFN cell or an MBSFN cell in a third MBSFN area different than the first MBSFN area, and means for continuing to receive the MBMS service directly from one or more cells in the first MBSFN area while receiving paging signals from the third cell.

The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
receiving a multimedia broadcast multicast service (MBMS) service from a first cell in a first multicast broadcast single frequency network (MBSFN) area while in a radio resource control (RRC) idle mode;
reselecting to a second cell through an intra-frequency cell reselection upon moving into coverage of the second cell;
determining whether the second cell is a non-MBSFN cell or an MBSFN cell in a second MBSFN area different than the first MBSFN area by determining whether a system information block 13 (SIB13) is acquired from the second cell, wherein when it is determined that the SIB13 is acquired from the second cell then it is determined that the second cell is the MBSFN cell in the second MBSFN area different than the first MBSFN area, and wherein when it is determined that the SIB13 is not acquired from the second cell then it is determined that the second cell is the non-MBSFN cell; and
continuing to receive the MBMS service directly from the first cell while receiving paging signals from the second cell.

2. The method of claim 1, further comprising acquiring system information blocks (SIBs) from the second cell.

3. The method of claim 1, further comprising continuing to receive the MBMS service from the first cell upon determining that the SIB13 is not acquired from the second cell.

4. The method of claim 2, further comprising:
acquiring a multicast control channel (MCCH) from the second cell upon determining the SIB13 is acquired from the second cell; and
determining whether the MBMS service is provided by the second cell based on the acquired MCCH.

5. The method of claim 4, further comprising continuing to receive the MBMS service from the first cell upon determining that the MBMS service is not provided by the second cell.

6. The method of claim 4, further comprising switching from receiving the MBMS service from the first cell to receiving the MBMS service from the second cell upon determining that the MBMS service is provided by the second cell.

7. The method of claim 1, further comprising monitoring only at least one of multicast channel (Mal) scheduling information (MSI) or a multicast control channel (MCCH) from the first cell while receiving the MBMS service from the first cell.

8. The method of claim 1, further comprising refraining from switching to receive a different MBMS service from the first cell when information for the different MBMS service was not previously received from the first cell.

9. The method of claim 1, further comprising:
determining at least one of whether data is being lost from the MBMS service from the first cell or a signal quality of the MBMS service from the first cell; and
stopping a reception of the MBMS service when at least one of lost data are greater than a first threshold or the signal quality is less than a second threshold.

10. The method of claim 1, further comprising:
reselecting to a third cell in the first MBSFN area from the second cell through an intra-frequency cell reselection upon moving into coverage of the third cell; and
continuing to receive the MBMS service directly from the third cell while receiving paging signals from the third cell.

11. The method of claim 1, further comprising:
receiving a configuration for a priority setting indicating a priority between receiving the MBMS service from the first cell and receiving a unicast service from the second cell;
receiving a message indicating a unicast service availability from the second cell; and
determining whether to receive the unicast service or the MBMS service based on the configuration for the priority setting.

12. The method of claim 11, further comprising:
stopping the reception of the MBMS service and receiving the unicast service when the configuration indicates a higher priority for the unicast service than the MBMS service; and
continuing to receive the MBMS service and refraining from receiving the unicast service when the configuration indicates a higher priority for the MBMS service than the unicast service.

13. The method of claim 1, further comprising:
receiving a message indicating a unicast service availability from the second cell; and
inquiring from a user whether to receive the unicast service or to continue receiving the MBMS service.

14. The method of claim 13, further comprising:
stopping the reception of the MBMS service and receiving the unicast service when the user indicates a desire to receive the unicast service; and
continuing to receive the MBMS service and refraining from receiving the unicast service when the user indicates a desire to continue receiving the MBMS service.

15. The method of claim 1, further comprising:
reselecting to a third cell through an intra-frequency cell reselection upon moving into coverage of the third cell, the third cell being a non-MBSFN cell or an MBSFN cell in a third MBSFN area different than the first MBSFN area; and
continuing to receive the MBMS service directly from one or more cells in the first MBSFN area while receiving paging signals from the third cell.

16. An apparatus for wireless communication, comprising:
means for receiving a multimedia broadcast multicast service (MBMS) service from a first cell in a first multicast broadcast single frequency network (MBSFN) area while in a radio resource control (RRC) idle mode;
means for reselecting to a second cell through an intra-frequency cell reselection upon moving into coverage of the second cell;
means for determining whether the second cell is a non-MBSFN cell or an MBSFN cell in a second MBSFN area different than the first MBSFN area by determining whether a system information block 13 (SIB13) is acquired from the second cell, wherein when it is determined that the SIB13 is acquired from the second cell then it is determined that the second cell is the MBSFN cell in the second MBSFN area different than the first MBSFN area, and wherein when it is determined that the SIB13 is not acquired from the second cell then it is determine that the second cell is the non-MBSFN cell; and
means for continuing to receive the MBMS service directly from the first cell while receiving paging signals from the second cell.

17. The apparatus of claim 16, further comprising means for acquiring system information blocks (SIBs) from the second cell.

18. The apparatus of claim 17, further comprising means for continuing to receive the MBMS service from the first cell upon determining that the SIB13 is not acquired from the second cell.

19. The apparatus of claim 17, further comprising:
means for acquiring a multicast control channel (MCCH) from the second cell upon determining the SIB13 is acquired from the second cell; and
means for determining whether the MBMS service is provided by the second cell based on the acquired MCCH.

20. The apparatus of claim 19, further comprising means for continuing to receive the MBMS service from the first cell upon determining that the MBMS service is not provided by the second cell.

21. The apparatus of claim 19, further comprising means for switching from receiving the MBMS service from the first cell to receiving the MBMS service from the second cell upon determining that the MBMS service is provided by the second cell.

22. The apparatus of claim 16, further comprising means for monitoring only at least one of multicast channel (MCH) scheduling information (MSI) or a multicast control channel (MCCH) from the first cell while receiving the MBMS service from the first cell.

23. The apparatus of claim 16, further comprising means for refraining from switching to receive a different MBMS service from the first cell when information for the different MBMS service was not previously received from the first cell.

24. The apparatus of claim 16, further comprising:
means for determining at least one of whether data is being lost from the MBMS service from the first cell or a signal quality of the MBMS service from the first cell; and
means for stopping a reception of the MBMS service when at least one of lost data are greater than a first threshold or the signal quality is less than a second threshold.

25. The apparatus of claim 16, further comprising:
means for reselecting to a third cell in the first MBSFN area from the second cell through an intra-frequency cell reselection upon moving into coverage of the third cell; and
means for continuing to receive the MBMS service directly from the third cell while receiving paging signals from the third cell.

26. The apparatus of claim 16, further comprising:
means for receiving a configuration for a priority setting indicating a priority between receiving the MBMS service from the first cell and receiving a unicast service from the second cell;
means for receiving a message indicating a unicast service availability' from it e second cell; and
means for determining whether to receive the unicast service or the MBMS service based on the configuration for the priority setting.

27. The apparatus of claim 26, further comprising:
means for stopping the reception of the MBMS service and receiving the unicast service when the configuration indicates a higher priority for the unicast service than the MBMS service; and
means for continuing to receive the MBMS service and refraining from receiving the unicast service when the configuration indicates a higher priority for the MBMS service than the unicast service.

28. The apparatus of claim 16, further comprising:
means for receiving a message indicating a unicast service availability from the second cell; and
means for inquiring from a whether to receive the unicast service or to continue receiving the MBMS service.

29. The apparatus of claim 28, further comprising:
means for stopping the reception of the MBMS service and receiving the unicast service when the user indicates a desire to receive the unicast service; and
means for continuing to receive the MBMS service and refraining from receiving the unicast service when the user indicates a desire to continue receiving the MBMS service.

30. The apparatus of claim 16, further comprising:
means for reselecting to a third cell through an intra-frequency cell reselection upon moving into coverage of the third cell, the third cell being a non-MBSFN cell or an MBSFN cell in a third MBSFN area different than the first MBSFN area; and
means for continuing to receive the MBMS service directly from one or more cells in the first MBSFN area while receiving paging signals from the third cell.

31. An apparatus of wireless communication, comprising:
a processing system configured to:
receive a multimedia broadcast multicast service (MBMS) service from a first cell in a first multicast broadcast single frequency network (MBSFN) area while in a radio resource control (RRC) idle mode;
reselect to a second cell through an intra-frequency cell reselection upon moving into coverage of the second cell;
determine whether the second cell is a non-MBSFN cell or an MBSFN cell in a second MBSFN area different than the first MBSFN area by determining whether a system information block 13 (SIB13) is acquired from the second cell, wherein when it is determined that the SIB13 is acquired from the second cell then it is determined that the second cell is the MBSFN cell in the second MBSFN area different than the first MBSFN area, and wherein when it is determined that the SIB13 is not acquired from the second cell then it is determined that the second cell is the non-MBSFN cell; and
continue to receive the MBMS service directly from the first cell while receiving paging signals from the second cell.

32. The apparatus of claim 31, wherein the processing system is further configured to acquire system information blocks (SIBs) from the second cell.

33. The apparatus of claim 32, wherein the processing system is further configured to continue receiving the MBMS service from the first cell upon determining that the SIB13 is not acquired from the second cell.

34. The apparatus of claim 32, wherein the processing system is further configured to:
acquire a multicast control channel (MCCH) from the second cell upon determining the SIB13 is acquired from the second cell; and
determine whether the MBMS service is provided by the second cell based on the acquired MCCH.

35. The apparatus of claim 34, wherein the processing system is further configured to continue receiving the MBMS service from the first cell upon determining that the MBMS service is not provided by the second cell.

36. The apparatus of claim 34, wherein the processing system is further configured to switch from receiving the MBMS service from the first cell to receiving the MBMS service from the second cell upon determining that the MBMS service is provided by the second cell.

37. The apparatus of claim 31, wherein the processing system is further configured to monitor only at least one of multicast channel (MCH) scheduling information (MSI) or a multicast control channel (MCCH) from the first cell while receiving the MBMS service from the first cell.

38. The apparatus of claim 31, wherein the processing system is further configured to refrain from switching to receive a different MBMS service from the first cell when information for the different MBMS service was not previously received from the first cell.

39. The apparatus of claim 31, wherein the processing system is further configured to:
   determine at least one of whether data is being lost from the MBMS service from the first cell or a signal quality of the MBMS service from the first cell; and
   stop a reception of the MBMS service when at least one of lost data are greater than a first threshold or the signal quality is less than a second threshold.

40. The apparatus of claim 31, wherein the processing system is further configured to:
   reselect to a third cell in the first MBSFN area from the second cell through an intra-frequency cell reselection upon moving into coverage of the third cell; and
   continue to receive the MBMS service directly from the third cell while receiving paging signals from the third cell.

41. The apparatus of claim 31, wherein the processing system is further configured to:
   receive a configuration for a priority setting indicating a priority between receiving the MBMS service from the first cell and receiving a unicast service from the second cell;
   receive a message indicating a unicast service availability from the second cell; and
   determine whether to receive the unicast service or the MBMS service based on the configuration for the priority setting.

42. The apparatus of claim 41, wherein the processing system is further configured to:
   stop the reception of the MBMS service and receiving the unicast service when the configuration indicates a higher priority for the unicast service than the MBMS service; and
   continue to receive the MBMS service and refraining from receiving the unicast service when the configuration indicates a higher priority for the MBMS service than the unicast service.

43. The apparatus of claim 31, wherein the processing system is further configured to:
   receive a message indicating a unicast service availability from the second cell; and
   inquire from a user whether to receive the unicast service or to continue receiving the MBMS service.

44. The apparatus of claim 43, wherein the processing system is further configured to:
   stop the reception of the MBMS service and receiving the unicast service when the user indicates a desire to receive the unicast service; and
   continue to receive the MBMS service and refraining from receiving the unicast service when the user indicates a desire to continue receiving the MBMS service.

45. The apparatus of claim 31, wherein the processing system is further configured to:
   reselect to a third cell through an intra-frequency cell reselection upon moving into coverage of the third cell, the third cell being a non-MBSFN cell or an MBSFN cell in a third MBSFN area different than the first MBSFN area; and
   continue to receive the MBMS service directly from one or more cells in the first MBSFN area while receiving paging signals from the third cell.

46. A non-transitory computer-readable medium comprising code that when executed on at least one processor causes the at least one processor to:
   receive a multimedia broadcast multicast service (MBMS) service from a first cell in a first multicast broadcast single frequency network (MBSFN) area while in a radio resource control (RRC) idle mode;
   reselect to a second cell through an intra-frequency cell reselection upon moving into coverage of the second cell;
   determine whether the second cell is a non-MBSFN cell or an MBSFN cell in a second MBSFN area different than the first MBSFN area by determining whether a system information block 13 (SIB13) is acquired from the second cell, wherein when it is determined that the SIB13 is acquired from the second cell then it is determined that the second cell is the MBSFN cell in the second MBSFN area different than the first MBSFN area, and wherein when it is determined that the SIB13 is not acquired from the second cell then it is determined that the second cell is the non-MBSFN cell; and
   continue to receive the MBMS service directly from the first cell while receiving paging signals from the second cell.

\* \* \* \* \*